US 12,480,585 B2

(12) United States Patent
Kettemann (10) Patent No.: US 12,480,585 B2
(45) Date of Patent: Nov. 25, 2025

(54) DRIVE ASSEMBLY FOR A DIAPHRAGM VALVE AND DIAPHRAGM VALVE

(71) Applicant: BUERKERT WERKE GMBH & CO. KG, Ingelfingen (DE)

(72) Inventor: Ralf Kettemann, Ingelfingen (DE)

(73) Assignee: Buerkert Werke Gmbh & Co. KG, Ingelfingen (DE)

( * ) Notice: Subject to any disclaimer, the term of this patent is extended or adjusted under 35 U.S.C. 154(b) by 14 days.

(21) Appl. No.: 18/619,452

(22) Filed: Mar. 28, 2024

(65) Prior Publication Data
US 2024/0328520 A1 Oct. 3, 2024

(30) Foreign Application Priority Data

Mar. 29, 2023 (DE) .......................... 102023108043.1

(51) Int. Cl.
*F16K 7/12* (2006.01)
*F16K 7/14* (2006.01)

(52) U.S. Cl.
CPC . *F16K 7/12* (2013.01); *F16K 7/14* (2013.01)

(58) Field of Classification Search
CPC . F16K 7/12; F16K 7/123; F16K 7/126; F16K 7/14; F16K 7/16; F16K 7/17; F16K 11/022
See application file for complete search history.

(56) References Cited

U.S. PATENT DOCUMENTS

| 6,508,266 B2 * | 1/2003 | Iritani | ..................... F16K 7/126 73/40.5 R |
| 9,458,943 B2 * | 10/2016 | Eurich | ................ F16K 31/1225 |

FOREIGN PATENT DOCUMENTS

| DE | 202021103024 U1 * | 6/2021 | ............. F16K 31/12 |
| EP | 3951221 A1 * | 2/2022 | ............. F16K 31/00 |

OTHER PUBLICATIONS

Machine English translation of EP_3951221_A1 (Year: 2025).*
Machine English translation of DE-202021103024-U1 (Year: 2025).*

* cited by examiner

*Primary Examiner* — Hailey K. Do
(74) *Attorney, Agent, or Firm* — McNees Wallace & Nurick (57) ABSTRACT

A diaphragm valve has a drive assembly and a fitting through which a fluid can flow which has a diaphragm mounted to the drive assembly. A drive unit has a pressure piece which can be displaced in a direction of stroke (A) of the diaphragm valve and which is adapted to be coupled in a nondestructively detachable manner to a lock structure on a diaphragm to move the diaphragm, and a locking unit for connecting the fitting to the drive unit. The locking unit comprises a lock hook which is pivotably mounted to the pressure piece and can assume an open and a closed position, and a pneumatically moved actuating element which acts on the lock hook to move the latter into the closed and/or open position, wherein in the closed position, the lock hook engages the lock structure on the diaphragm.

10 Claims, 9 Drawing Sheets

DRIVE ASSEMBLY FOR A DIAPHRAGM VALVE AND DIAPHRAGM VALVE

TECHNICAL FIELD

The disclosure relates to a drive assembly of a diaphragm valve and to a diaphragm valve.

BACKGROUND

For the control of media, for example in chemical or pharmaceutical installations, diaphragm valves are used the fitting of which that is in contact with the media is configured as a single-use component and has to be replaced after each use. To this end, the fitting should, of course, be adapted to be fixed to the drive unit of the diaphragm valve so as to be easily replaceable.

The object of the disclosure is to simplify the assembly of a replaceable fitting in a diaphragm valve.

SUMMARY

According to the disclosure, a drive assembly of a diaphragm valve comprises a drive unit having at least one pressure piece which can be displaced in a direction of stroke of the diaphragm valve, the pressure piece being adapted to be coupled in a nondestructively detachable manner to a lock structure on a diaphragm of a fitting through which a fluid can flow to move the diaphragm. The drive assembly also comprises a locking unit for connecting the fitting through which a fluid can flow to the drive unit, the locking unit including a lock hook which is pivotably mounted to the pressure piece and can assume an open and a closed position, and a pneumatically moved actuating element which acts on the lock hook to move the latter into the closed and/or open position.

The pneumatically moved actuating element of the locking unit permits an at least semi-automatic change of the fitting, the locking unit being opened and/or closed pneumatically by compressed air supplied to the actuating element, whereas the removal of the fitting from the drive unit and the insertion of a new fitting can be carried out manually by an operator of the installation. The supply of compressed air can be controlled by a central control unit. In this way, the replacement of the fitting can be realized in a few steps, which saves time and thus costs.

It is also a major advantage that this also allows a simple and quick replacement of fittings on a plurality of diaphragm valves arranged close to each other, in an installation, for example, as it is not necessary to actuate the respective locking units manually.

A higher degree of automation in which the removal and the insertion of the fittings is also automated, would of course also be conceivable.

In this way, the connection of the fitting to the drive unit is decoupled from the mounting movement of the fitting with which it is guided to the drive unit. For example, the fitting may be guided to and removed from the drive unit by a purely axial movement, i.e. without a rotational movement of the fitting.

The coupling takes place purely via the pivoting of the lock hook which is caused by the pneumatically moved actuating element.

This has the advantage that replaceable fittings can also be used in fluid systems in which a rotational movement for assembly or disassembly cannot be carried out. For example, the drive unit may remain permanently fixed in position in the fluid system.

In this way, the replacement of the fittings can be realized in a centrally controlled manner.

As is conventionally known, a drive of the diaphragm valve which is received in the drive unit moves the pressure piece(s) for example via valve tappets, the axis of movement running parallel to the direction of stroke of the diaphragm valve. Via the coupling to the lock hook, the pressure piece moves the diaphragm which in this area respectively cooperates with a valve seat arranged therebelow and opens or closes fluid paths in the fitting accordingly.

The lock hook is configured to engage the fitting in the closed position and to connect the latter to a pressure piece of the drive assembly.

It has been proven to be sufficient to provide only one lock hook per pressure piece.

The lock hook moves along the (imaginary) axis of movement together with the pressure piece as it is fastened thereto.

As the lock hook is mounted directly to the pressure piece, it performs the same linear movement as the pressure piece. In particular, when the valve is closed, the movement is transferred from the pressure piece to the diaphragm, and when the valve is opened, the movement is transferred from the lock hook to the diaphragm.

The connection between the lock hook and the diaphragm is for example a positive connection, for example in that the lock structure forms a counterpart to the lock hook which engages behind the lock hook.

The lock structure is in particular arranged on a projection projecting perpendicular to the surface of the diaphragm, which enables both a good transmission of movement via the pressure piece and a secure connection to the lock hook. Furthermore, the fitting can thus easily be configured to be attached to and removed from the drive unit in a purely axial movement.

If two pressure pieces are provided, the diaphragm for example has two parallel projections each having one lock structure.

For example, the projection rests in a planar manner on the pressure piece to limit the freedom for lateral movement of the diaphragm with respect to the pressure piece as far as possible.

In contrast thereto, the pneumatically moved actuating element always remains in a fixed axial position with respect to the drive unit, i.e. it does not move up and down along with the pressure piece and the lock hook. The actuating element is for example mounted to a drive housing of the diaphragm valve.

For example, the lock hook is spring-loaded in the closed position, so that a force application into the open position by the pneumatically moved actuating element is necessary and the lock hook moves into the closed position due to the spring-effect when the urging force applied by the pneumatically moved actuating element decreases.

It is also conceivable to detect the position of the pneumatically moved actuating element and/or of the lock hook, by means of an inductive proximity switch, for example.

The pneumatically moved actuating element is for example a pneumatic cylinder having a linearly displaceable piston, an axial end of the piston cooperating with a pressure surface on the lock hook. If the piston is acted upon with compressed air and pushed out of the pneumatic cylinder, it acts onto the lock hook via the pressure surface and pivots the latter, for example into the open position.

The piston can be aligned perpendicular to the direction of stroke to be able to develop an optimum lever effect for pivoting the lock hook.

The number of pneumatic cylinders in a single locking unit depends in particular on the size of the pressure piece. In many cases, the use of a single pneumatic cylinder is sufficient, it is however also possible to use two or more pneumatic cylinders per locking unit.

To prevent unintentional opening of the lock hook, the pressure surface may be configured and arranged so as to be axially displaced relative to the piston when the diaphragm valve in its closed position, so that no contact is possible between the piston and the pressure surface, i.e. no contact between the pneumatically moved actuating element and the lock hook.

It is conceivable to provide a specific replacement position in which the pressure piece is retracted to the maximum along the direction of stroke in the direction of the drive unit, a contact between the pneumatically moved actuating element and the lock hook being possible only in this replacement position. A replacement of the fitting is thus only possible if the drive unit has shifted the pressure piece up to the replacement position. In the replacement position, the diaphragm does not rest against a valve seat of the fitting.

For example, the pressure surface is concavely curved relative to the pneumatic cylinder transversely to the direction of stroke, whereas the pressure surface is not curved along the direction of stroke. The curvature serves to center the piston end to achieve a uniform force application into the lock hook during the shifting movement of the piston. The straight extension along the direction of stroke ensures that the end of the piston can slide along the pressure surface upon pivoting movement of the lock hook and the associated tilting of the pressure surface with respect to the direction of stroke. To further minimize frictional losses, the end of the piston which comes into contact with the pressure surface can be rounded.

For example, the locking unit comprises at least one spring element on the pressure piece which urges the lock hook in particular into the closed position. In this way, the lock hook can be configured normally closed, which represents a safeguard to keep the lock hook in engagement with the lock structure of the diaphragm.

In this case, only the opening of the locking unit, i.e. the movement of the lock hook into the open position can be caused by the pneumatically moved actuating element, whereas the closing of the locking unit, i.e. the transfer of the lock hook into the closed position after a return movement of the piston into the retracted position is performed by the spring element.

In one preferred variant, the spring element is at least one compression spring fixed to the pressure piece. For example, the compression spring is received in a mount formed integrally with the pressure piece or in a mount firmly fastened to the pressure piece. The compression spring is in particular a coil spring.

In one possible variant, two compression springs are arranged parallel to each other on the pressure piece, are aligned parallel to the piston of the pneumatic cylinder, and are arranged on both sides of the pneumatic cylinder. However, depending on the nominal size of the diaphragm valve and on the withdrawal forces acting on the diaphragm during operation, for example, only one single or more than two compression springs could be provided.

To limit a pivoting movement of the lock hook into the opened position, the lock hook can have at least one projection which is directed towards the pressure piece and forms an end stop for the pivoting movement of the lock hook. When the projection contacts the pressure piece, the spring element is thus bridged. Any excessive forces are then introduced directly from the lock hook into the pressure piece.

With regard to the pivoting movement of the lock hook into the closed position, however, the maximum pivoting path of the lock hook and the strength of the spring element are for example selected so large that tolerances as to the shape and the position of the lock hook and the lock structure of the diaphragm can be reliably compensated and the lock hook always rests on the lock structure of the diaphragm with a minimum predetermined pretensioning force. If the maximum pivoting path is not travelled, the increasing counterpressure by the spring force of the spring element automatically provides a stop of the lock hook. A secure connection between the drive unit and the diaphragm is thus always ensured.

If the spring element always urges the lock hook into the closed position, it secures the lock hook over the entire stroke also during normal operation of the diaphragm valve.

The drive unit can for example include exactly one or exactly two pressure pieces. The diaphragm is accordingly provided with exactly one or exactly two lock structures. If two pressure pieces are provided, the pressure pieces can in particular be moved independently of each other, and thus a plurality of valve seats can be opened or closed independently of each other by means of one single diaphragm.

The disclosure can be implemented both for fittings having one single valve seat and for fittings having two valve seats. Accordingly, the drive unit has exactly one or exactly two pressure pieces on each of which a single lock hook is arranged.

The aforementioned object is also achieved by a diaphragm valve having a drive assembly as described above and a fitting mounted to the drive assembly, the lock hook engaging the lock structure on the diaphragm in the closed position.

The diaphragm valve is for example part of a fluid system such as a valve island having a plurality of diaphragm valves and fittings arranged side by side in a row, a ring, a rectangle or generally in a matrix. In such systems, it is often necessary to replace a plurality of adjacent fittings at the same time. As described above, the pneumatically moved actuating element of the locking units of the individual diaphragm valves allows the fittings to be replaced semi-automatically. To this end, the pneumatically moved actuating elements of all diaphragm valves concerned are actuated simultaneously by a central control unit so that the locking units thereof are opened simultaneously and the lock hooks pivot into the open position. It is therefore possible to replace all fittings in one single operation. Once the fittings have been replaced, the central unit can switch off the application of compressed air to the pneumatically moved actuating elements so that the locking units are closed again, in particular by the spring elements, and all lock hooks are moved back into the closed position.

The compressed air may be provided by a control media connection of the valve island, for example.

The locking unit should be configured such that the fitting can be removed from the drive unit and mounted to the drive unit without tools. The fitting can thus be easily replaced manually.

For example, only the opening of the locking unit is carried out by the actuation of the pneumatically moved actuating element.

To compensate for an eccentric force application by the pneumatically moved actuating element onto the pressure piece, the pressure piece may have a support structure cooperating with a valve-fixed structure to secure the pressure piece against rotation. The valve-fixed structure is firmly fixed to a drive housing of the drive unit, for example. When the support structure comes to rest against the valve-fixed structure, the drive housing can absorb a torque about the direction of stroke generated by the pneumatically moved actuating element by a force application offset with respect to the center axis of the pressure piece.

For example, the support structure may be an axial projection on the pressure piece which cooperates with a stop pin projecting radially inwards from the drive housing. In a further variant, the support structure is a beam which extends along the direction of stroke, is firmly connected to the pressure piece, and is guided in a mating longitudinal groove in the drive housing.

The connection between the lock hook and the diaphragm is usually only provided for connecting the pressure piece to the diaphragm of the fitting to transmit the drive movement of the drive unit to the diaphragm, in particular during the opening movement.

To fix the fitting itself to the drive assembly, a plurality of guiding rods can be arranged on the drive unit, for example, which in particular project from the drive unit along the axis of movement of the pressure pieces, and onto which the fitting is fitted so that the fitting is held in position radially and in the peripheral direction with respect to the drive unit by means of the guiding rods and is in particular secured against tilting and rotation about the axis of movement.

In one variant, the fitting is arranged between the drive unit and a fixing unit which secures the fitting to the drive unit. The fixing unit comprises for example a plate having openings so that the plate is adapted to be fitted onto the guiding rods, and a fixing mechanism, for example in the form of an eccentric lever, which can be actuated manually or in an automated manner to clamp the fixing unit and the fitting to the guiding rods in the desired axial position.

BRIEF DESCRIPTION OF THE DRAWINGS

The disclosure will be described in more detail below on the basis of two example embodiments and with reference to the accompanying figures, in which.

DETAILED DESCRIPTION

Identical reference numerals (and numbers respectively incremented by 100) denote identical or substantially identical components and parts of different embodiments and variants. For reasons of clarity, not all components are always provided with reference numerals.

Figure 1:
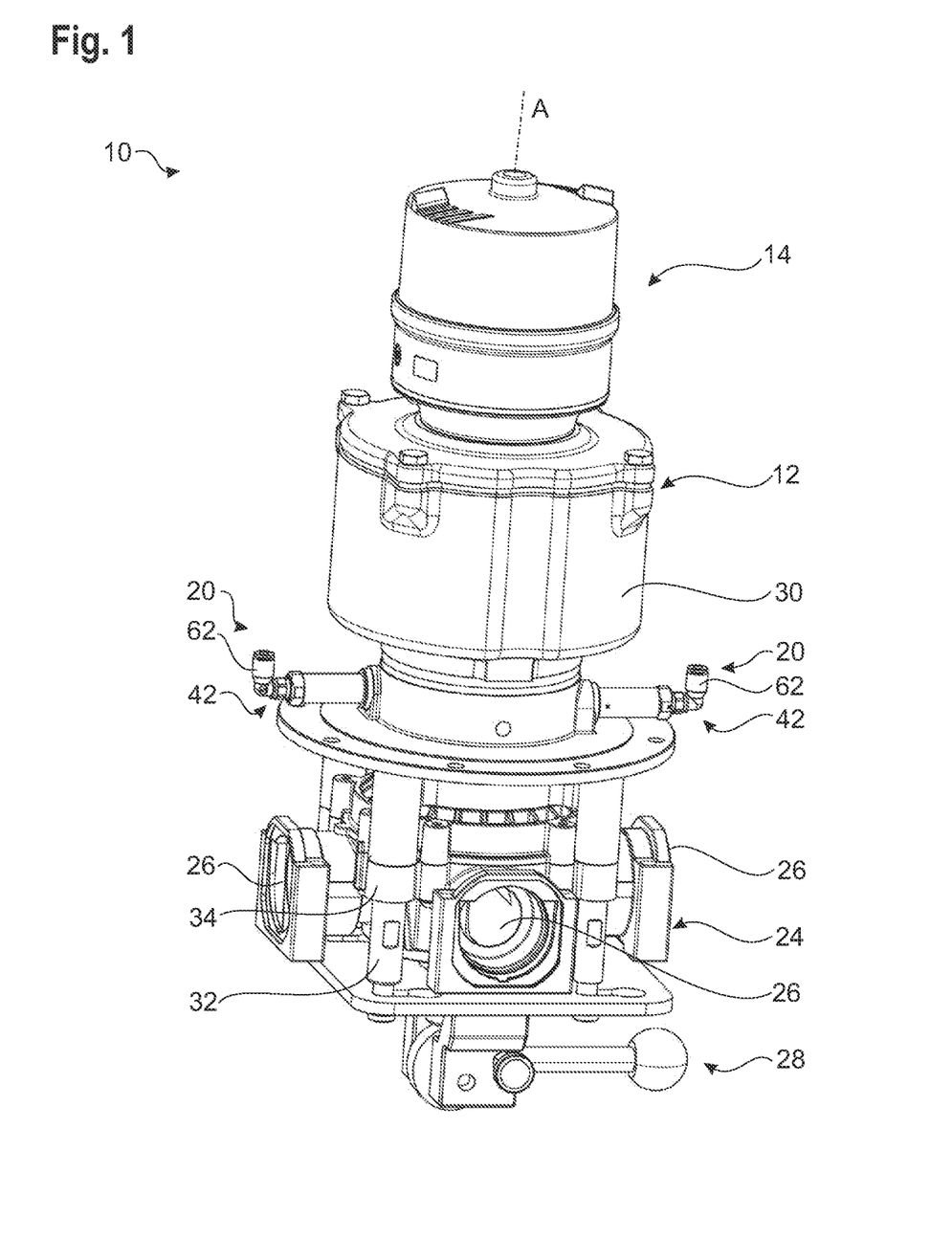
FIG. 1 shows a diaphragm valve according to the disclosure in a first embodiment.

FIG. 1 shows a diaphragm valve 10 for fluid media according to a first embodiment.

The diaphragm valve 10 comprises a drive assembly 12 which is fixed in position and permanently mounted in a fluid system (not shown in detail).

Figure 3:
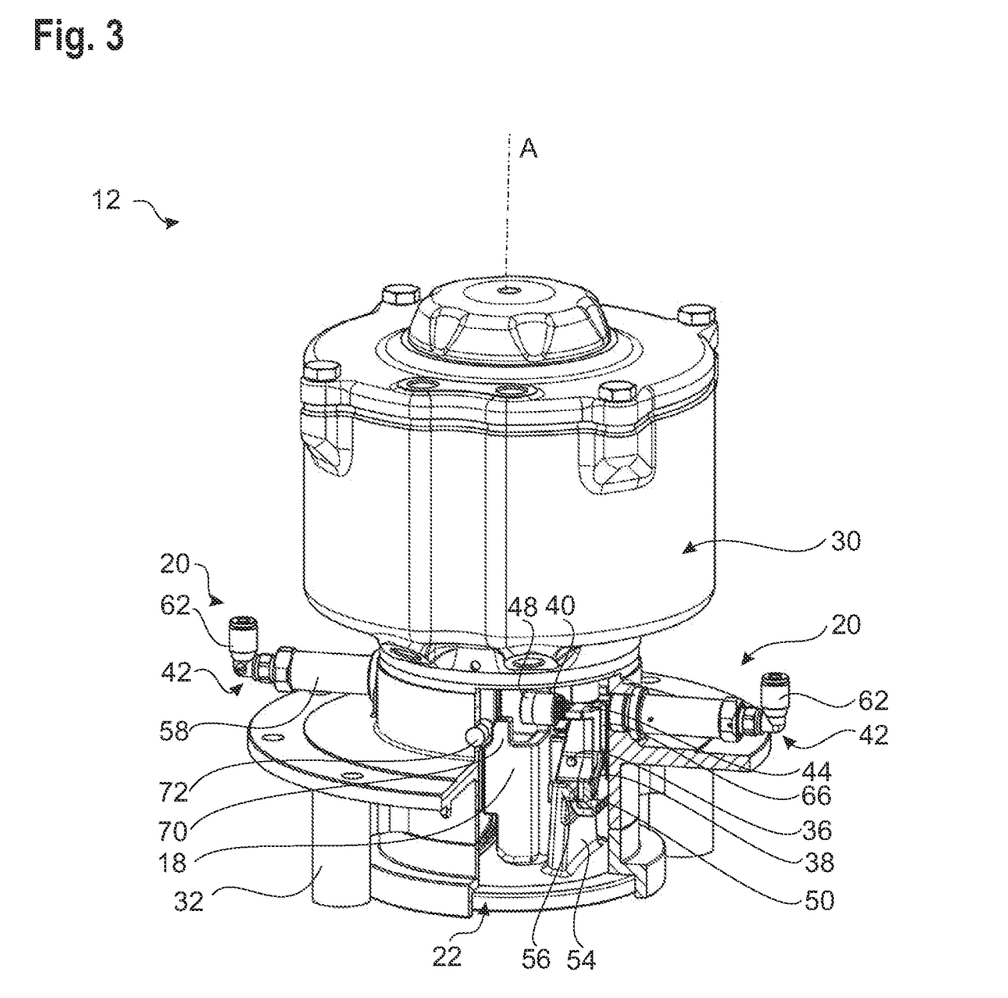
FIG. 3 shows the diaphragm valve of FIG. 2 in a replacement position of the fitting in a closed state of the locking unit.
Figure 4:
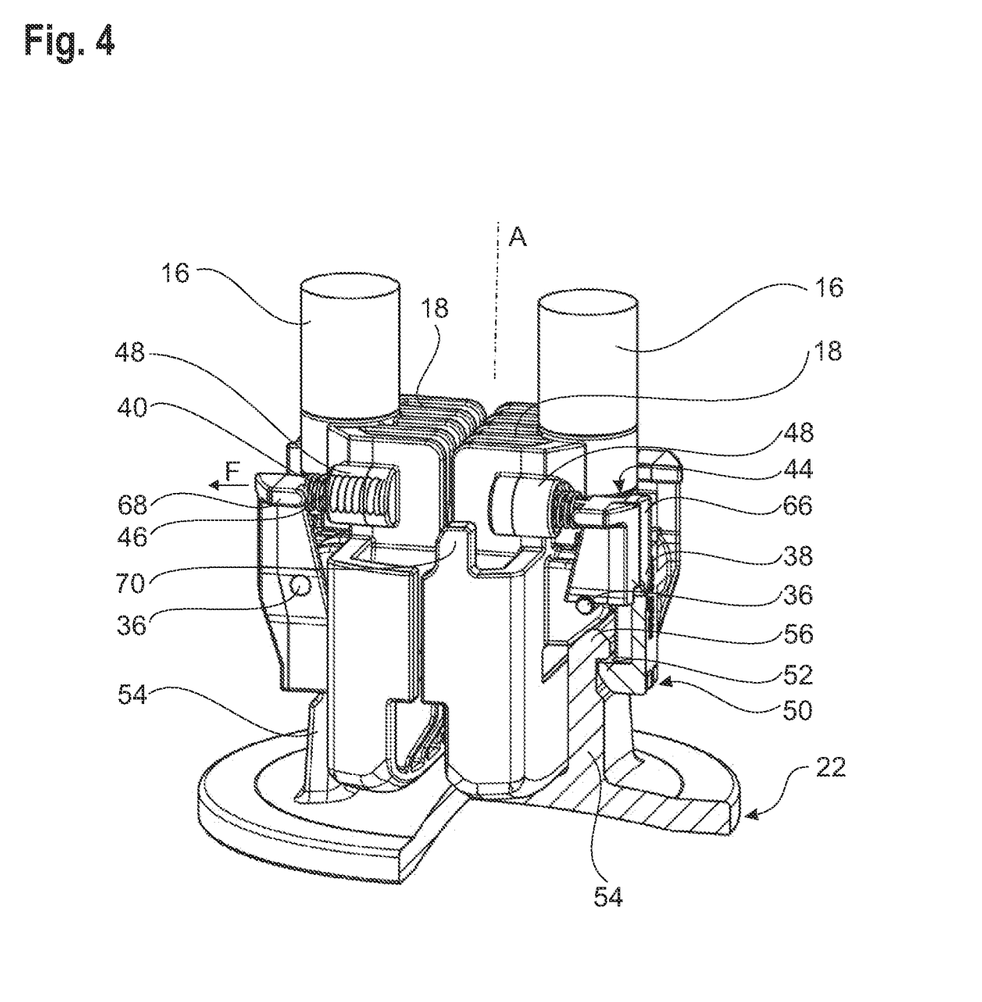
FIG. 4 shows an enlarged view of the pressure pieces of the diaphragm valve of FIG. 2.

The drive assembly 12 comprises a drive unit 14 having a drive mechanism (not shown) which can move two parallel valve tappets 16 up and down along a direction of stroke A (see FIG. 4). Each of the valve tappets 16 is connected at a lower end in the figures to a pressure piece 18 (see FIG. 3) such that the pressure piece 18 follows the movement of the valve tappets 16.

The pressure pieces 18 are connected to a diaphragm 22 of a fitting 24 via a locking unit 20, such that a movement of the pressure pieces 18 is transmitted to the diaphragm 22, as a result of which fluid passages in the interior of the fitting 24 are closed or opened.

The fitting 24 is a replaceable single-use part having a plurality of fluid connections 26, all of which are here arranged in a plane perpendicular to the direction of stroke A. The diaphragm 22 is part of the fitting 24 and is firmly and non-detachably connected to the remaining fitting 24, such that it is replaced together with the latter after use.

In addition to the locking unit 20 which engages exclusively the diaphragm 22, a fixing unit 28 which can be detached without tools is also present here to fix the fitting 24 to the drive assembly 12. As shown in FIG. 1, the fitting 24 is arranged between the drive assembly 12 and the fixing unit 28.

Here, a plurality of guiding rods 32 which extend parallel to each other along the direction of stroke A are attached to a drive housing 30 of the drive assembly 12.

The fitting 24 has corresponding guiding sleeves 34 which are fitted onto the guiding rods 32 when the fitting 24 is mounted to the drive assembly 12. The guiding rods 32 specify a correct mounting position of the fitting 24 with respect to the drive unit 14 and prevent a rotation and tilting about the direction of stroke A. The mounting position is here unambiguously defined by an asymmetric arrangement of the components.

In the mounted state, the fitting 24 is therefore held axially between the drive assembly 12 and the fixing unit 28.

The locking unit 20 comprises a lock hook 38 mounted to the pressure piece 18 for pivoting movement about the axis 36, a spring element 40 fixed to the pressure piece 18 (see FIG. 4), which here urges the lock hook 38 into a closed position, and a pneumatically moved actuating element 42 which acts on the lock hook 38 to move the latter into an open position (see FIGS. 2 to 5).

As two pressure pieces 18 are present in this embodiment, an own locking unit 20 is provided for each of the pressure pieces 18.

The lock hook 38 is permanently fixed to the pressure piece 18 via the axis 36.

At the upper end 44 in the figures which is urged by the actuating element 42, the lock hook 38 has a pin 46 extending approximately perpendicular to the direction of stroke A (see FIG. 4). The pin 46 projects into the spring element 40 which is here configured as a compression spring and in particular as a coil spring. An axial end of the compression spring thus surrounds the pin 46.

The opposite axial end of the compression spring is received in a cylindrical mount 48 which is firmly connected, in this example integrally connected to the pressure piece 18.

The spring element 40 is fixed in its position between the pressure piece 18 and the lock hook 38 by the mount 48 and the pin 46. This is shown in a sectional view in FIG. 4 on the left side.

Figure 2:
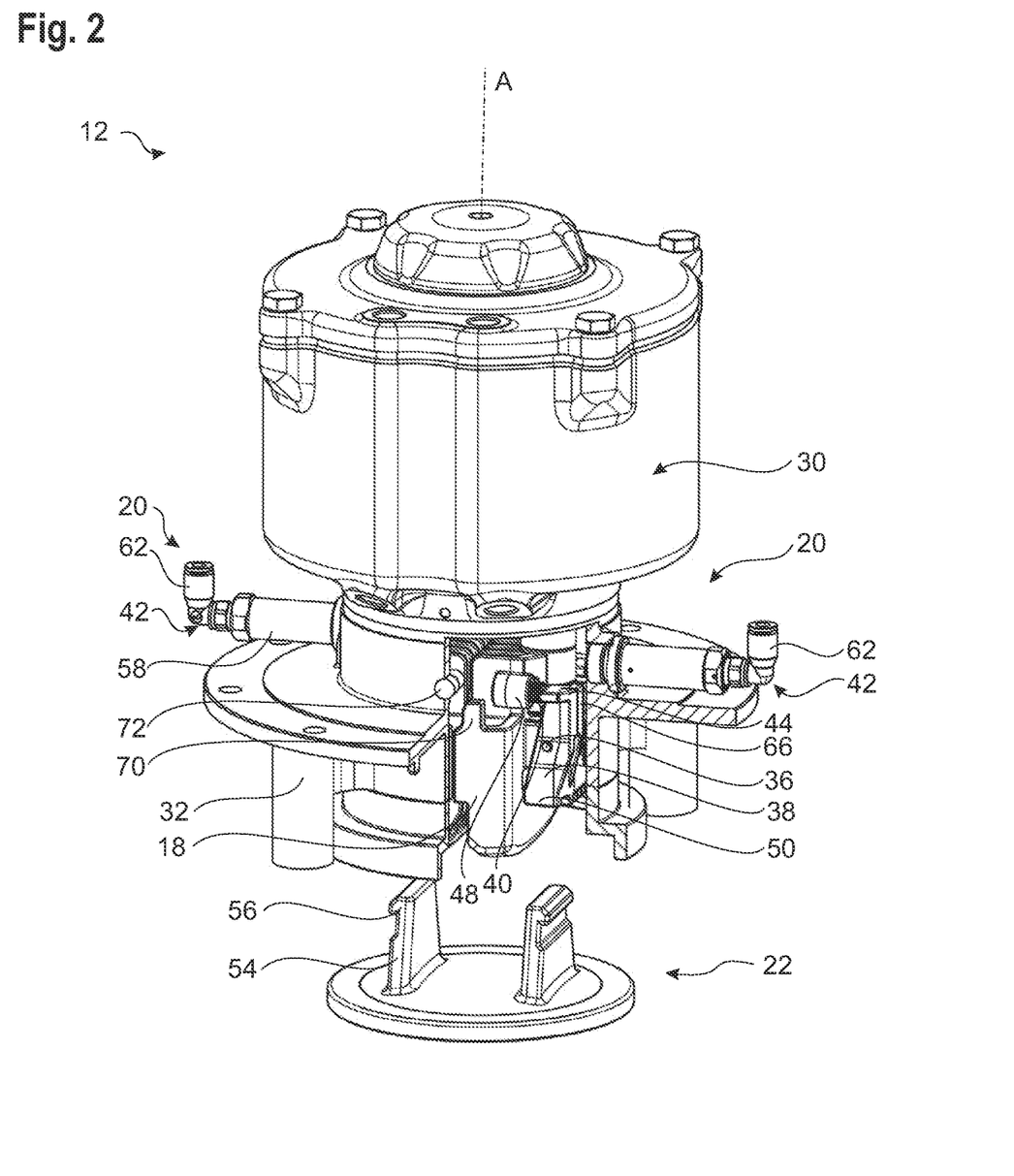
FIG. 2 shows the diaphragm valve of FIG. 1 in a partially sectioned partial exploded view, in a closed state of a locking unit and in a closed position of the diaphragm valve in a working position of the fitting.

The spring element 40 exerts a pretensioning force F acting radially outwards with respect to the direction of stroke A onto the upper end 44 of the lock hook 38, which urges the lock hook 38 into a closed position in which a lower end 50 in the figures, opposite the end 44, is pivoted radially inwards. This closed position of the lock hook 38 is shown in FIGS. 2 to 4.

At the end 50, the lock hook 38 has a lock projection 52 oriented radially inwards.

The lock hook 38 on the second pressure piece 18 has an identical structure. The two pressure pieces 18 and the locking unit 20 are here arranged in a mirror-inverted manner to each other.

The diaphragm 22 has two parallel web-like projections 54 which project from a surface of the diaphragm 22 along the direction of stroke A, at the free, in the figures upper end of which a lock structure 56 is respectively formed. The lock structure 56 here has the shape of a radially outwardly directed hook which is adapted to the shape of the lock projection 52 of the lock hook 38, such that the lock projection 52 and the lock structure 56 can positively engage each other (see FIGS. 3 and 4).

The fitting 24 is coupled to the drive assembly 12 via this positive connection to transmit the movement of the pressure piece 18 along the direction of stroke A to the diaphragm 22 and thus open and close the diaphragm valve 10.

The pretensioning force applied by the spring element 40 is sufficient to keep the lock hook 38 engaged with the lock structure 56 in any operating condition of the diaphragm valve 10.

Here, the projection 54 rests in a planar manner on the pressure piece 18 for stabilization.

The diaphragm 22 is usually made of a soft and elastic material, for example an elastomer.

A further connection between the drive assembly 12 and the fitting 24, apart from the guiding rods 32 and the fixing unit 28, is not provided here.

Figure 5:
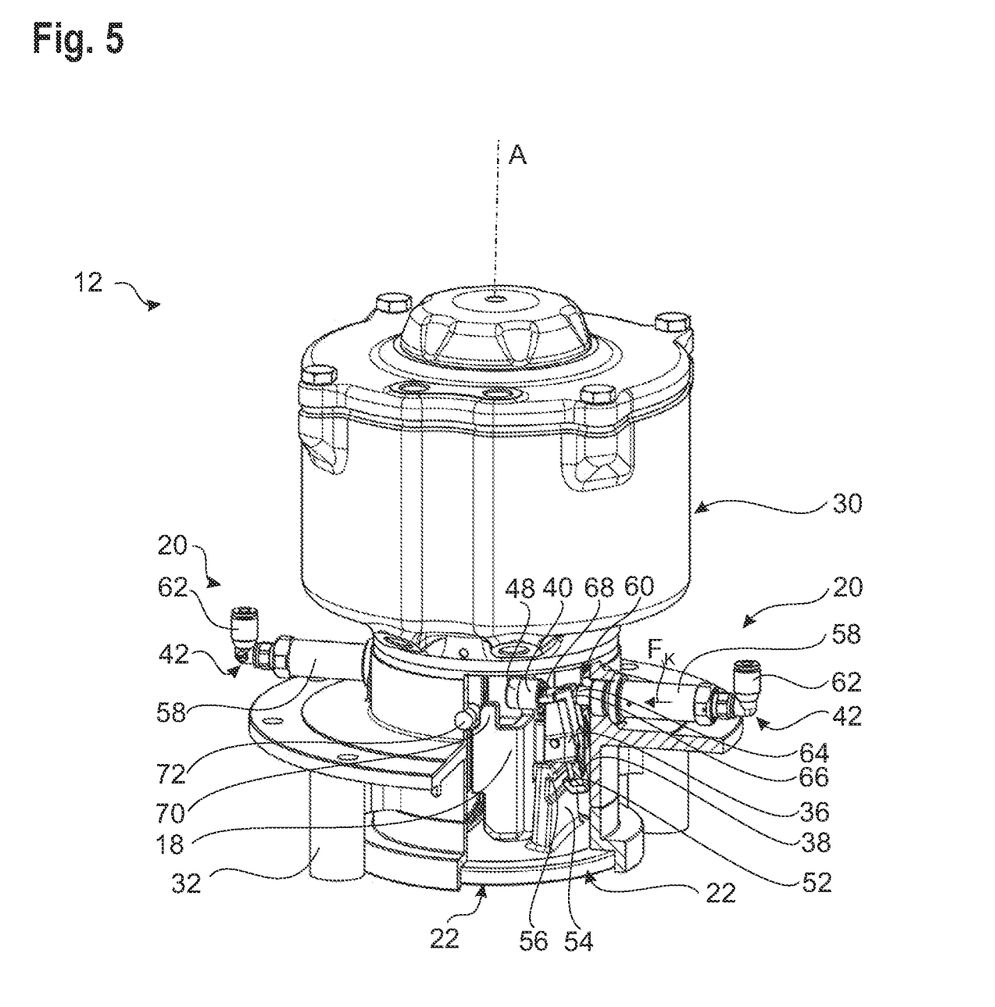
FIG. 5 shows the diaphragm valve of FIG. 2 in a replacement position of the fitting in an open state of the locking unit.

In the open position of the lock hook 38 shown in FIG. 5, the lock hook 38 releases the lock structure 56, and the fitting 24 can be removed from the drive unit 14 of the diaphragm valve 10 downwards in the figures along the direction of stroke A.

The pneumatically moved actuating element 42 is operated to bring the lock hook 38 into the open position.

The pneumatically operated actuating element 42 is here a pneumatic cylinder 58 having a linearly displaceable piston 60 (see FIG. 5). The pneumatic cylinder 58 is oriented such that the piston 60 moves perpendicular to the direction of stroke A.

In this example, the piston 60 is extended out of the pneumatic cylinder 58 in the direction of the respective associated pressure piece 18 by compressed air supplied via a compressed air connection 62, when the pneumatically operated actuating element 42 is operated. A return spring (not shown) pretensioning the piston 60 into a retracted position is arranged within the pneumatic cylinder 58. The force applied via the compressed air is higher than the spring force of this return spring. If the compressed air supply is terminated or if the compressed air supply fails, the piston 60 is moved back into its retracted position by the return spring.

In this example, one end 64 of the piston 60 acting on the lock hook 38 is configured to be rounded.

In the extended position of the piston 60, the end 64 of the piston 60 acts onto a pressure surface 66 on the lock hook 38 which is positioned at the upper end 44 of the lock hook 38, on the side facing the actuating element 42. In the retracted position, the end 64 of the piston 60 is always spaced apart from the pressure surface 66 and thus from the lock hook 38.

The pressure surface 66 is arranged in a line with the spring element 40 and the pin 46 of the lock hook 38, so that a force $F_K$ applied onto the pressure surface 66 by the piston 60 is transmitted in a straight line onto the spring element 40 and compresses the latter.

A point of application of the end 64 of the piston 60 on the pressure surface 66 is located on the drive side of the pivot axis 36 of the lock hook 38.

Due to the force $F_K$, the upper end 44 of the lock hook 38 pivots radially inwards, and the lower end 50 of the lock hook 38 pivots accordingly radially outwards.

The pressure surface 66 is here concavely curved perpendicular to the direction of stroke A with respect to the end 64 of the piston 60. Here, the pressure surface 66 extends in a straight line along the direction of stroke A such that the pressure surface 66 forms a partially cylindrical surface. Due to this shape and the rounded end 64 of the piston 60, the end 64 of the piston 60 slides without significant frictional losses along the pressure surface 66 when the lock hook 38 pivots between the closed and the open position.

On its side facing the pressure piece 18, the lock hook 38 has a projection 68 at the upper end 44, which forms an end stop for the pivoting movement of the lock hook 38 with respect to the pressure piece 18 caused by the piston 60. In this example, the projection 68 comes into contact with the mount 48 of the spring element 40 after the maximum pivoting angle of the lock hook 38 and thus prevents the lock hook 38 from further pivoting radially outwards.

The pivoting movement of the lock hook 38 radially inwards caused by the spring element 40 is limited by the projection 54 of the diaphragm 22 and is here selected such that a tolerance compensation in the pivoting angle is taken into account, i.e. it is ensured that the lock projection 52 of the lock hook 38 always rests on the lock structure 56 of the diaphragm 22 with a predetermined minimum force.

Figure 7:
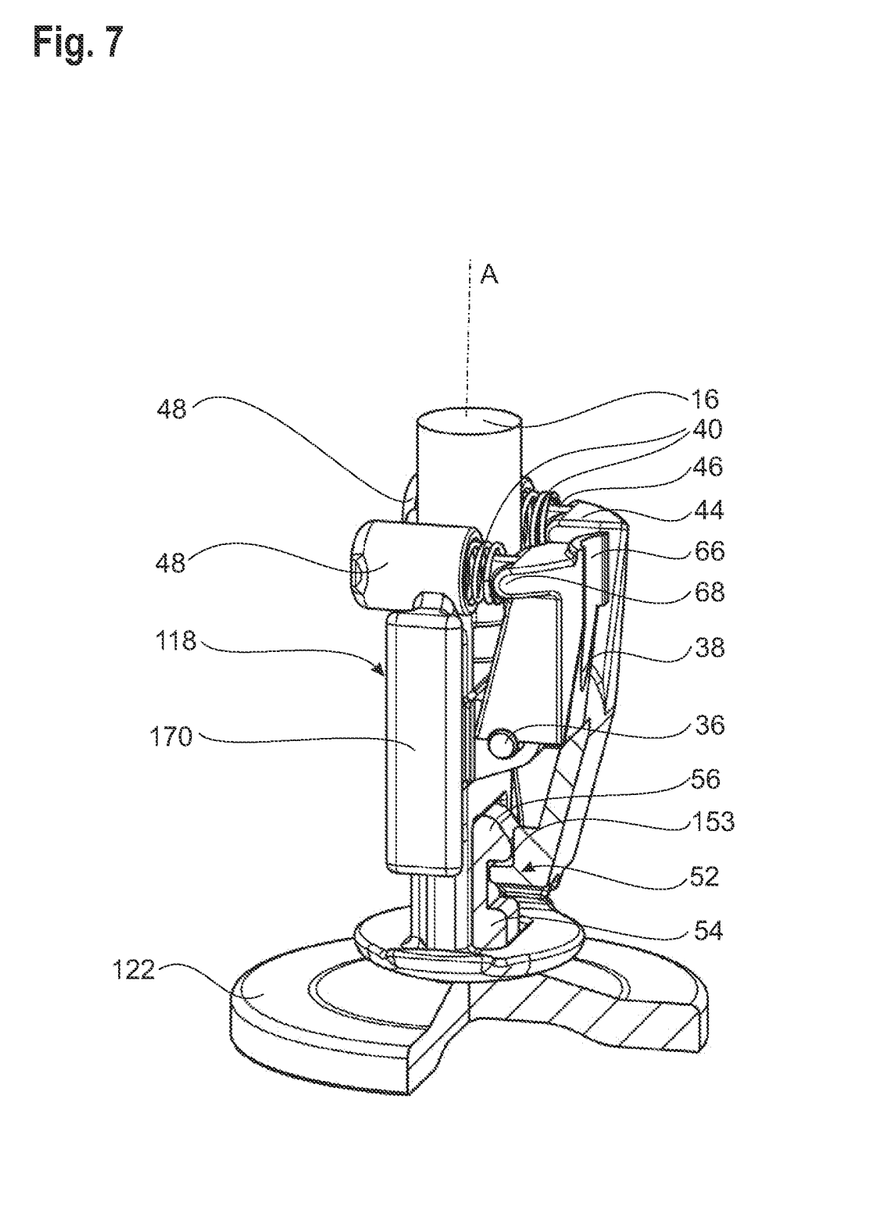
FIG. 7 shows an enlarged view of the pressure piece of the diaphragm valve of FIG. 6, partially in section.

In this example, two spring elements 40 are placed parallel to each other on both sides of the respective pressure piece 18 (in the same way as in the illustration in FIG. 7). The pneumatic cylinder 58 is arranged between the two spring elements 40. It is also conceivable that the pneumatic cylinder 58 is arranged so as to be aligned with one of the spring elements 40.

A support structure 70 is here arranged on at least one of the pressure pieces 18 and counteracts a rotation of the pressure piece 18 about the direction of stroke A by an eccentric attack of the piston 60 of the actuating element 42.

Here, the support structure 70 is a projection on the pressure piece 18 aligned along the direction of stroke A.

This projection cooperates with a valve-fixed structure 72, here a radially inwardly projecting stop pin on the drive housing 30 of the drive assembly 12 which is positioned so as to come to rest on the projection of the support structure 70 and thus prevents a further rotation of the pressure piece 18.

As the pressure piece 18 moves along the direction of stroke A upon actuation of the diaphragm valve 10, the pressure surface 66 also moves along the direction of stroke A (here downwards) when the diaphragm valve is closed (see FIG. 2). The length of the pressure surface 66 along the direction of stroke A is selected such that in this closed state of the diaphragm valve 10, the piston 60 of the actuating element 42 could not come into contact with the lock hook 38, even if it is extended. An unintentional opening of the locking unit 20 is thus excluded.

It is conceivable to configure the drive assembly 12 such that in addition to the movement of stroke along the direction of stroke A which is necessary for closing and opening the diaphragm valve, a position with a larger stroke is realized as a replacement position. In this case, the pressure surface reaches a position in which the piston 60 of the actuating element 42 can act thereon only in this replacement position of the fitting (shown in FIG. 5).

The diaphragm valve 10 is designed such that the fitting 24 is changed semi-automatically and completely without tools.

If the fitting 24 is to be changed, an operator of the fluid system in which the corresponding diaphragm valve 10 is installed selects the corresponding menu item for the desired diaphragm valve 10 or an entire group of diaphragm valves 10 on an input device (not shown).

A control unit (not shown) of the fluid system then moves the pressure pieces 18 of the relevant diaphragm valves 10 from a working position of the fitting (see e.g. FIG. 2) into the replacement position of the fitting described above and activates the pneumatically moved actuating elements 42 of the respective locking units 20. In the diaphragm valve 10 described above which includes two pressure pieces 18, both locking units 20 are of course respectively opened.

The pistons 60 of the respective pneumatic cylinders 58 act on the pressure surface 66 and pivot the lock hooks 38 into the open position.

In addition, the fixing unit 38 is opened, here manually or optionally in an automated manner, and is removed from the drive assembly 12 so that the fitting 24 is freely accessible.

Since the lock hooks 38 have now released the lock structure 56 on the diaphragm 22 of the fitting 24 by pivoting radially outwards, the fitting 24 can simply be removed manually from the guiding rods 32.

The operator places a new fitting 24 on the guiding rods 32 and pushes it into its desired axial position.

This procedure is carried out for all diaphragm valves 10 that are currently concerned.

The fixing unit 28 is then placed back onto the guiding rods 32 for all diaphragm valves 10 concerned and secured there, the fitting 24 being pressed axially against the drive unit 14.

Finally, the operator completes the replacement process at the input device by selecting the corresponding menu item. The control unit closes the compressed air supply to the pneumatically moved actuating element 42 so that the piston 60 of the respective pneumatic cylinder 58 is retracted in its retracted position and the spring elements 40 pivot the lock hook 38 back into its closed position.

The lock hooks 38 engage the lock structures 56 on the diaphragm 22 of the fitting 24 and thus connect the diaphragm 22 to the pressure pieces 18.

The respective diaphragm valve 10 is now ready for the next operation.

FIGS. 6 to 9 show a second embodiment of a diaphragm valve 10, only the drive assembly 112 and the diaphragm 122 of the fitting 24 being respectively shown.

Figure 6:
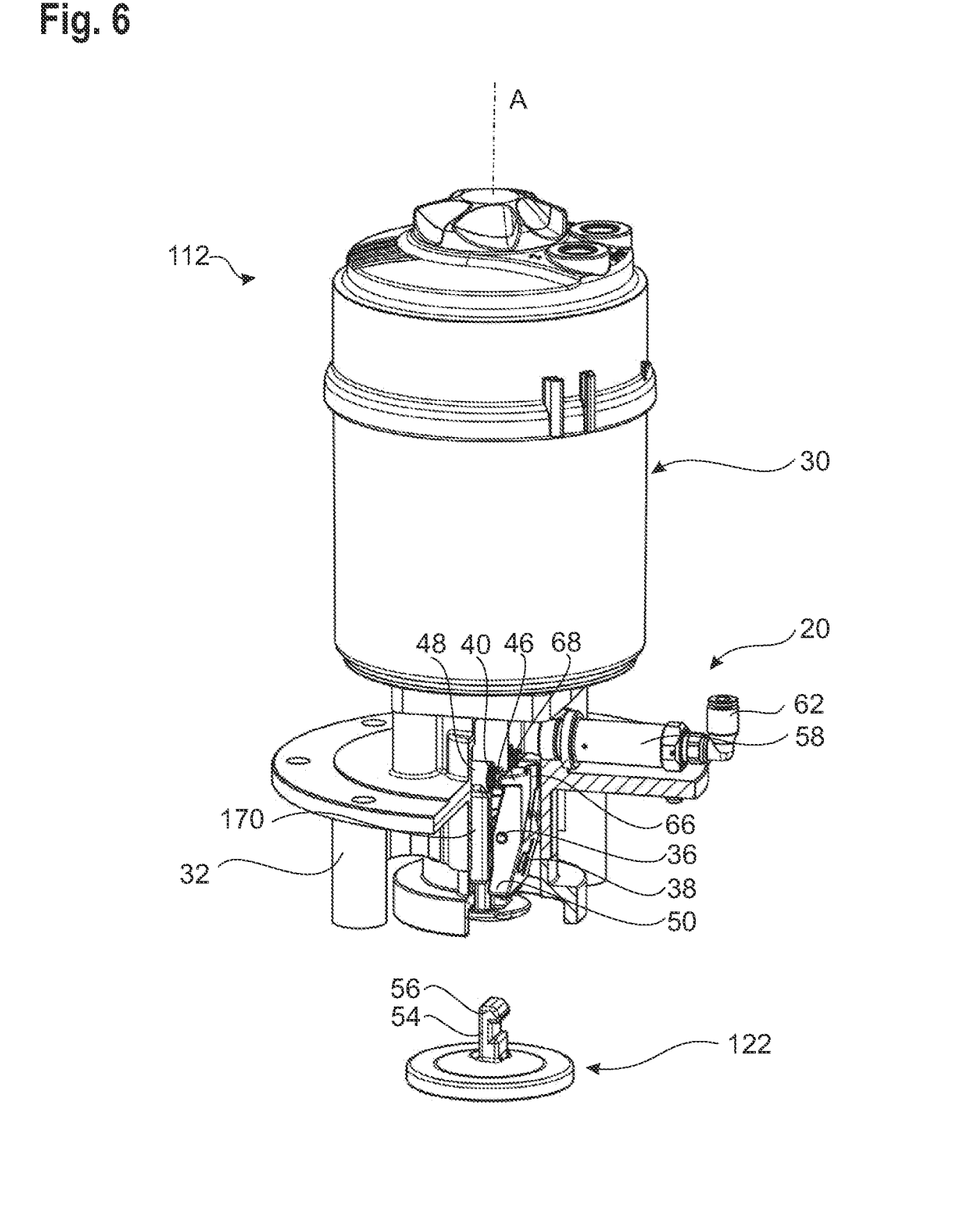
FIG. 6 shows a diaphragm valve according to the disclosure in a second embodiment in a partially sectioned exploded view, in a closed state of a locking unit and in a closed position of the diaphragm valve in a working position of the fitting.
Figure 8:
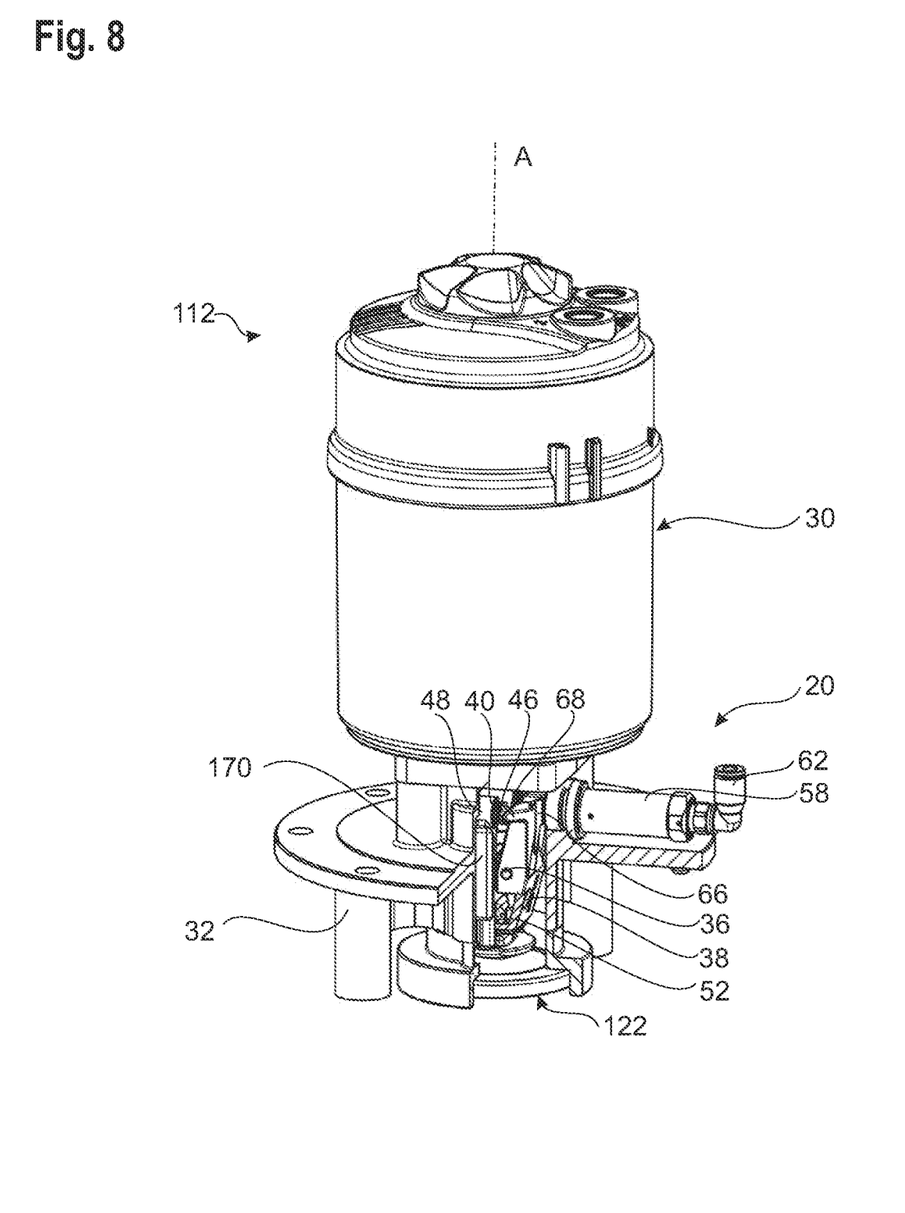
FIG. 8 shows the diaphragm valve of FIG. 6 in a working position of the fitting in a closed state of the locking unit, partially in section.
Figure 9:
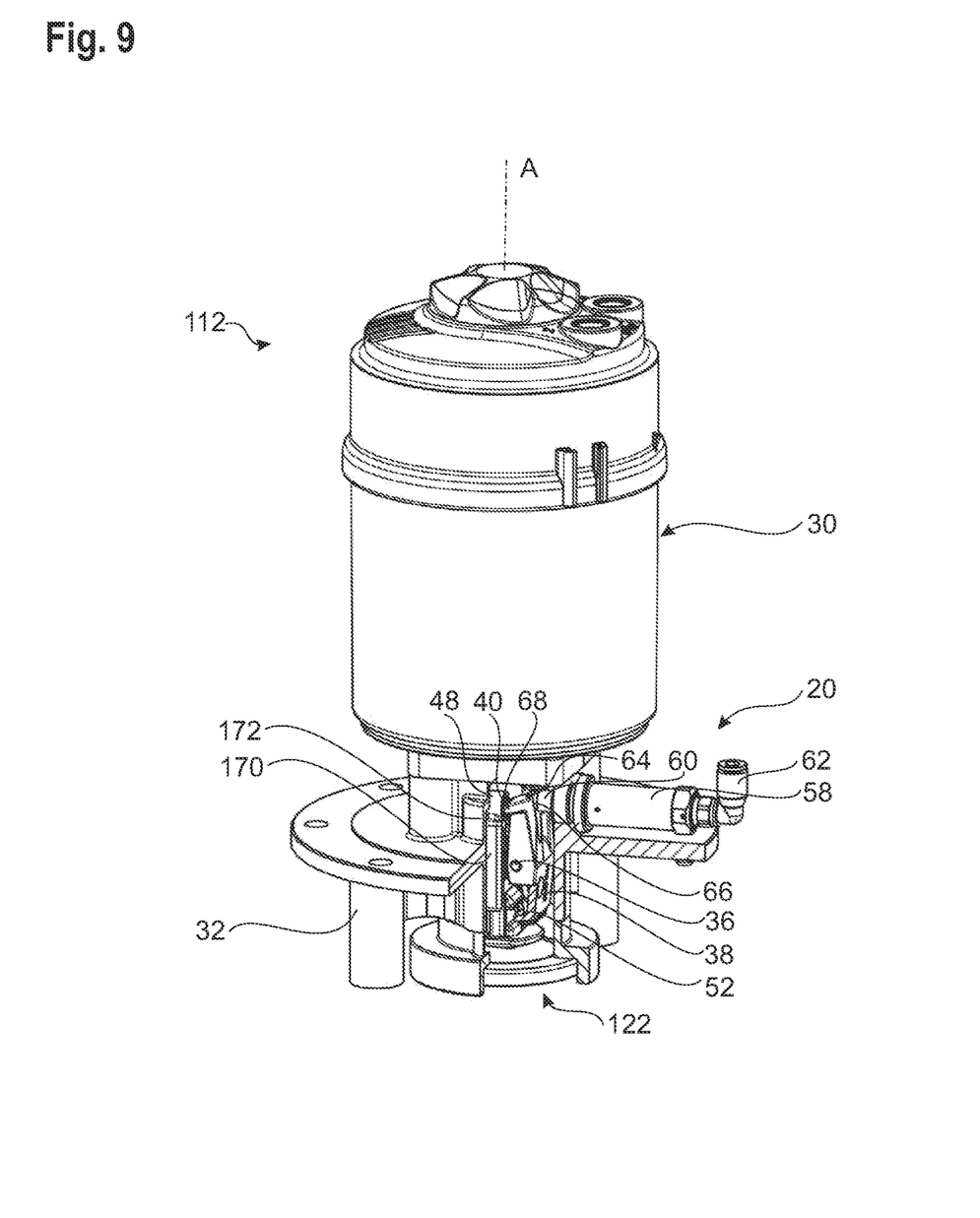
FIG. 9 shows the diaphragm valve of FIG. 6 in a replacement position of the fitting in an open state of the locking unit, partially in section.

FIGS. 6 to 8 each show the locking unit 20 in the closed state and the lock hook 38 in the closed position, while FIG. 9 shows the locking unit 20 in the open state and the lock hook 38 in the open position.

FIG. 6 shows the diaphragm valve 10 in the working position of the fitting, while the diaphragm valve 10 in FIG. 8 is shown in the replacement position of the fitting.

One difference to the first embodiment is that only a single valve tappet 16 and only a single pressure piece 118 are provided here (see FIG. 7).

Accordingly, the diaphragm 122 also has only a single projection 54 with a lock structure 56, into which the single lock hook 38 on the pressure piece 118 engages.

In this example, the lock projection 52 is configured so as to be stepped at the end 50 of the lock hook 38, so that an additional support surface 153 is formed, which here extends along the direction of stroke A and supports a free end of the lock structure 56 radially outwards.

A further difference is that the support structure 170 on the pressure piece is designed as a beam-shaped projection aligned along the direction of stroke A and the valve-fixed structure 172 is a correspondingly shaped longitudinal groove on the drive housing 30, in which the projection is axially guided. This prevents the pressure piece 118 from rotating when force is applied by the piston 60 of the pneumatically moved actuating element 42 (see FIG. 9).

The assembly and disassembly of the fitting 24 (not shown here) is carried out as in the first embodiment.

All features of the individual embodiments and variants can be freely interchanged or combined with one each other at the discretion of a skilled person. In particular, a fixing unit as described for the first embodiment can also be used in the second embodiment, even if this is not shown in the figures.

The invention claimed is:

1. A drive assembly of a diaphragm valve, comprising:
   a drive unit having at least one pressure piece which can be displaced in a direction of stroke of the diaphragm valve and which is adapted to be coupled in a nondestructively detachable manner to a lock structure on a diaphragm of a fitting through which a fluid can flow to move the diaphragm,
   a locking unit for connecting the fitting to the drive unit, the locking unit including a lock hook which is pivotably mounted to the at least one pressure piece and can assume an open and a closed position, and
   a pneumatically moved actuating element which acts on the lock hook to move the latter into the closed and/or open position,
   wherein the pneumatically moved actuating element is a pneumatic cylinder having a linearly displaceable piston, an axial end of the piston cooperating with a pressure surface on the lock hook, and wherein a movement direction of the piston is aligned perpendicular to the direction of stroke.

2. The drive assembly according to claim 1, wherein the pressure surface is concavely curved relative to the pneumatic cylinder transversely to the direction of stroke (A), whereas the pressure surface is not curved along the direction of stroke (A).

3. The drive assembly according to claim 1, wherein the drive unit has exactly two pressure pieces, which can be displaced in a direction of stroke of the diaphragm valve and which each are adapted to be coupled in a nondestructively detachable manner to an associated lock structure on the diaphragm of the fitting to move the diaphragm, and two locking units for connecting the fitting to the drive unit, each locking unit including one lock hook which is pivotably mounted to one of the pressure pieces and can assume an open and a closed position, and two pneumatically moved actuating elements, wherein each lock hook is associated with one of the two pneumatically moved actuating elements and each pneumatically moved actuating element acts on the associated lock hook to move the lock hook into the closed position and/or the open position.

4. The drive assembly according to claim 1, wherein the locking unit comprises at least one spring element on the at least one pressure piece, which urges the lock hook.

5. The drive assembly according to claim 4, wherein the at least one spring element urges the lock hook into the closed position.

6. The drive assembly according to claim 4, wherein the at least one spring element is at least one compression spring fixed to the at least one pressure piece.

7. The drive assembly according to claim 4, wherein the lock hook has at least one projection which is directed towards the at least one pressure piece and forms an end stop for the pivoting movement of the lock hook.

8. A diaphragm valve having a drive assembly comprising:

a drive unit having at least one pressure piece which can be displaced in a direction of stroke of the diaphragm valve and which is adapted to be coupled in a nondestructively detachable manner to a lock structure on a diaphragm of a fitting through which a fluid can flow to move the diaphragm, a locking unit for connecting the fitting to the drive unit, the locking unit including a lock hook which is pivotably mounted to the at least one pressure piece and can assume an open and a closed position, a pneumatically moved actuating element which acts on the lock hook to move the latter into the closed and/or open position, and a fitting which includes the diaphragm and is mounted to the drive assembly, wherein in the closed position, the lock hook engages the lock structure on the diaphragm, wherein the pneumatically moved actuating element is a pneumatic cylinder having a linearly displaceable piston, an axial end of the piston cooperating with a pressure surface on the lock hook, and wherein a movement direction of the piston is aligned perpendicular to the direction of stroke.

9. The diaphragm valve according to claim 8, wherein the locking unit is configured such that the fitting can be removed from the drive unit and mounted to the drive unit without tools.

10. A diaphragm valve having a drive assembly comprising:

a drive unit having at least one pressure piece which can be displaced in a direction of stroke of the diaphragm valve and which is adapted to be coupled in a nondestructively detachable manner to a lock structure on a diaphragm of a fitting through which a fluid can flow to move the diaphragm, a locking unit for connecting the fitting to the drive unit, the locking unit including a lock hook which is pivotably mounted to the at least one pressure piece and can assume an open and a closed position, a pneumatically moved actuating element which acts on the lock hook to move the latter into the closed and/or open position, and a fitting which includes the diaphragm and is mounted to the drive assembly, wherein in the closed position, the lock hook engages the lock structure on the diaphragm, and a fitting which includes the diaphragm and is mounted to the drive assembly, wherein in the closed position, the lock hook engages the lock structure on the diaphragm, wherein the at least one pressure piece has a support structure cooperating with a valve-fixed structure to secure the at least one pressure piece against rotation.

* * * * *